(12) United States Patent  
Kudo et al.

(10) Patent No.: US 10,465,692 B2  
(45) Date of Patent: Nov. 5, 2019

(54) FAN MOTOR

(71) Applicant: SANYO DENKI CO., LTD., Tokyo (JP)

(72) Inventors: Naruhiko Kudo, Tokyo (JP); Munenori Takakuwa, Tokyo (JP); Tatsuya Midorikawa, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 113 days.

(21) Appl. No.: 14/248,791

(22) Filed: Apr. 9, 2014

(65) Prior Publication Data

US 2014/0314596 A1 Oct. 23, 2014

(30) Foreign Application Priority Data

Apr. 17, 2013 (JP) .................. 2013-086758

(51) Int. Cl.
*F04D 19/00* (2006.01)
*H02K 5/10* (2006.01)
(Continued)

(52) U.S. Cl.
CPC ....... *F04D 19/002* (2013.01); *F04D 25/0613* (2013.01); *F04D 25/0646* (2013.01);
(Continued)

(58) Field of Classification Search
CPC ........ H02K 29/03; H02K 19/06; H02K 21/44; H02K 19/24; H02K 1/246; H02K 21/16; H02K 19/103; H02K 29/06; H02K 1/141; H02K 21/22; H02K 2201/15; H02K 37/16; H02K 3/18; H02K 3/28; H02K 3/487; H02K 41/03; H02K 5/08; H02K 9/06; H02K 5/10; F04D 19/002; F04D 25/082; F04D 25/0646; F04D 25/0613
(Continued)

(56) References Cited

U.S. PATENT DOCUMENTS 4,128,527 A  12/1978  Kinjo et al.
4,344,006 A   8/1982  Mendelson
(Continued)

FOREIGN PATENT DOCUMENTS

CN  201365150 Y  12/2009
CN  102035284 A   4/2011
(Continued)

OTHER PUBLICATIONS

Nakamura et al., Bushless dc Motor with Large Air Gap, 1998, Electrical Engineering in Japan, vol. 125 No. 3, pp. 67-74.*
(Continued)

*Primary Examiner* — Kenneth J Hansen
(74) *Attorney, Agent, or Firm* — Polsinelli PC

(57) ABSTRACT

A fan motor is provided that prevents restraint on a rotor in an environment where oil and dust are floating in the air. The fan motor includes a stator constituted of an armature having a winding thereon, a rotor constituted of an excitation unit including a permanent magnet, and a vane wheel fixed to the rotor and including a plurality of vanes. The vanes or the vane wheel are formed so as to generate airflow from the side of a frame boss toward a hub unit of the vane wheel.

7 Claims, 4 Drawing Sheets

(51) Int. Cl.
| | |
|---|---|
| *H02K 9/06* | (2006.01) |
| *F04D 25/06* | (2006.01) |
| *F04D 25/08* | (2006.01) |
| *F04D 29/70* | (2006.01) |
| *H02K 7/14* | (2006.01) |

(52) U.S. Cl.
CPC ......... *F04D 25/082* (2013.01); *F04D 29/703* (2013.01); *H02K 5/10* (2013.01); *H02K 7/14* (2013.01); *H02K 9/06* (2013.01)

(58) Field of Classification Search
USPC ......... 417/354, 369, 370, 423.7; 310/85, 86, 310/87, 88
See application file for complete search history.

(56) References Cited

U.S. PATENT DOCUMENTS

| | | | | |
|---|---|---|---|---|
| 5,099,165 | A * | 3/1992 | Ackermann | ........... H02K 29/03 310/156.31 |
| 6,359,354 | B1 | 3/2002 | Watanabe et al. | |
| 2001/0001269 | A1 | 5/2001 | Asai | |
| 2001/0036409 | A1 | 11/2001 | Murata et al. | |
| 2007/0145842 | A1 * | 6/2007 | Zhu | ...................... F04D 29/582 310/88 |
| 2007/0189892 | A1 | 8/2007 | Oguma | |
| 2009/0155097 | A1 | 6/2009 | Winkler | |
| 2009/0196744 | A1 | 8/2009 | Yu et al. | |
| 2010/0119389 | A1 | 5/2010 | Lasebnik et al. | |
| 2011/0027075 | A1 | 2/2011 | Nogami et al. | |
| 2011/0074230 | A1 | 3/2011 | Hasegawa et al. | |
| 2011/0175493 | A1 | 7/2011 | Li | |
| 2012/0319543 | A1 * | 12/2012 | Adachi | ................... H02K 5/10 310/68 R |
| 2014/0199191 | A1 * | 7/2014 | Yamamoto | .......... F04D 29/5813 417/423.7 |

FOREIGN PATENT DOCUMENTS

| | | | |
|---|---|---|---|
| EP | 0310391 A2 | 4/1989 | |
| JP | H10191611 A * | 7/1998 | ............ H02K 15/12 |
| JP | 2000-27796 A | 1/2000 | |
| JP | 2000-046057 A | 2/2000 | |
| JP | 2001-128408 A | 5/2001 | |
| JP | 2001-342996 A | 12/2001 | |
| JP | 2003-333787 A | 11/2003 | |
| JP | 2004-040934 A | 2/2004 | |
| JP | 2006-246557 A | 9/2006 | |
| JP | 2001-128408 A | 5/2011 | |
| JP | 2013-021903 A | 1/2013 | |
| JP | 2013-47489 A | 3/2013 | |
| JP | 2014-136997 A * | 7/2014 | |

OTHER PUBLICATIONS

Office Action dated Sep. 20, 2016 issued in Japanese Patent Application No. 2013-086758, pp. 1-3.
Communication dated Aug. 30, 2016 issued in European Patent Application No. 14164133.2, pp. 1-9.
Office Action dated Mar. 21, 2017 issued in corresponding to Japanese Patent Application No. 2013-086758.
Communication pursuant to Article 94(3) EPC dated May 16, 2017 issued in European Patent Application No. 14164133.2.
Office Action dated Jun. 20, 2017 issued in corresponding Chinese Patent Application No. 201410141171.6.
Communication dated Nov. 9, 2017 issued in corresponding European Patent Application No. 14 164 133.2, pp. 1-7.
Nakamura, Yoshinobu et al. "Brushless dc Motor with Large Air Gap," Electrical Engineering in Japan, 1998, vol. 125, No. 3, pp. 67-74.
Office Action dated Feb. 11, 2018 issued in the corresponding Chinese Patent Application No. 201410141171.6, pp. 1-6.

* cited by examiner

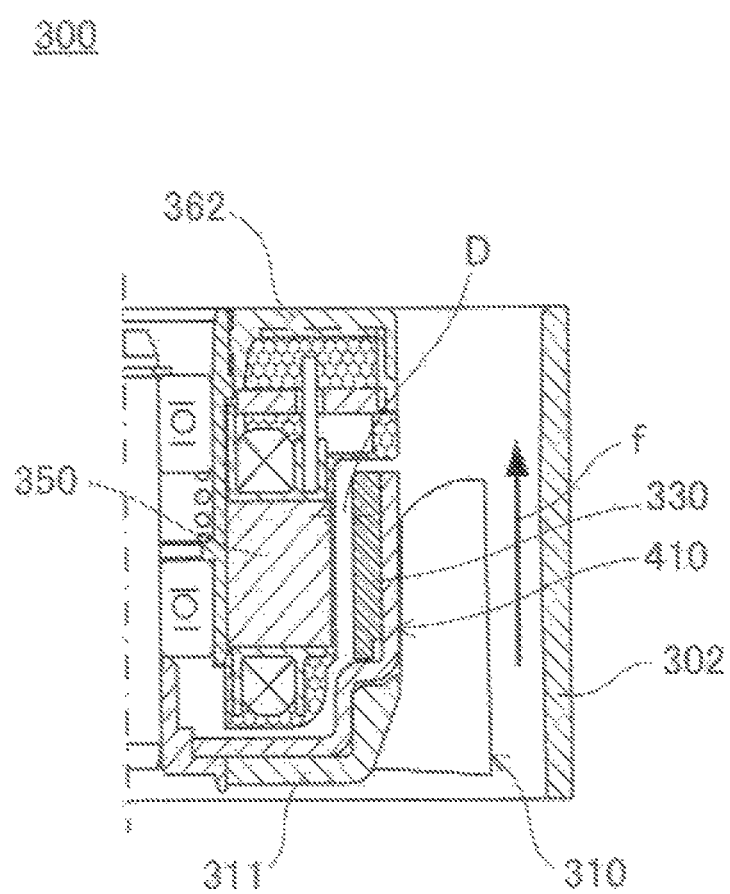

FAN MOTOR

CROSS-REFERENCE TO RELATED APPLICATION

This application claims priority to Japanese Application No. 2013-086758, filed Apr. 17, 2013, the entirety of which is incorporated herein by reference.

BACKGROUND

1. Technical Field

The present invention relates to a fan motor with an improved airflow arrangement and an improved oil-proof and dust-proof structure.

2. Description of Related Art

A fan motor is a ventilating device that rotates a vane wheel attached to a rotary shaft, to thereby aspirate air from one side of the motor in the axial direction of the rotary shaft and discharge the air from the other side in the axial direction. The fan motor has a simple structure but provides a large airflow with a low static pressure, and is widely employed, for example, as a cooling fan and a ventilating fan for a personal computer.

An environment-resistant fan motor is normally incorporated with an outer-rotor type brushless motor. The outer rotor type brushless motor includes an armature having winding serving as an inner stator, and an excitation unit having a permanent magnet provided along the outer periphery of the stator, the excitation unit serving as an outer rotor. A vane wheel is fitted to the outer rotor. The vane wheel includes a plurality of vanes for generating an airflow inside a venturi casing.

In conventional environment-resistant brushless direct-current (BLDC) fan motors, the live part is covered with a resin member to protect the part where an electric current runs from moisture, oil, and dust.

The environment-resistant fan motors thus far developed include an axial flow fan in which a circuit board including coils of a core unit and electronic parts is molded with an epoxy resin that can be cured by an aromatic amine-based hardener, for example as disclosed in Japanese Unexamined Patent Application Publication No. 2006-246557.

The BLDC fan motor has a simple structure, and is hence often used in a severe environment where cutting oil and dust are floating in the air, such as a machinery assembly plant. In the case where the fan motor is turned off for a long period of time in the environment where cutting oil and dust are floating in the air, the floating oil and dust stick to the vanes and the hub unit of the fan motor.

When oil is deposited on the vane or the hub unit, the oil drips down along the sidewall of the hub unit, and intrudes into inside of the fan motor thus to firmly reside therein. In the case where the oil firmly resides inside the fan motor, the rotation of the rotor is disturbed, or the rotor may even be restrained and inhibited from rotating, when the fan motor is activated again.

SUMMARY

The present invention has been accomplished in view of the foregoing situation, and provides a fan motor capable of reducing restraint on the rotor in an environment where oil and dust are floating in the air.

In an aspect, the present invention provides a fan motor including a stator constituted of an armature having a winding thereon, a rotor constituted of an excitation unit including a permanent magnet, and a vane wheel fixed to the rotor and including a plurality of vanes.

The vanes or the vane wheel are formed so as to generate an airflow from the side of a frame boss toward a hub unit of the vane wheel.

The vanes or the vane wheel of the fan motor according to the present invention are formed so as to generate an airflow from the side of the frame boss toward the hub unit of the vane wheel. Accordingly, the side of the frame boss is on the windward side of the airflow direction in the fan motor according to the present invention, which is opposite to the airflow direction in the conventional fan motor.

The airflow direction in the fan motor according to the present invention suppresses deposition of oil on the hub unit of the vane wheel . Accordingly, the oil is suppressed from flowing into inside of the fan motor, and therefore the rotor can be prevented from being restrained in an environment where oil and dust are floating in the air.

BRIEF DESCRIPTION OF THE DRAWINGS

FIG. 4 is a cross-sectional view of a fan motor according to a comparative example.

DETAILED DESCRIPTION

Hereafter, a fan motor according to an embodiment of the present invention will be described with reference to the drawings.

The fan motor according to this embodiment is configured with an improved airflow arrangement and has an improved oil-proof and dust-proof structure, and is therefore capable of reducing restraint on the rotor in an environment where oil and dust are floating in the air.

[Configuration of Fan Motor]

Figure 1:
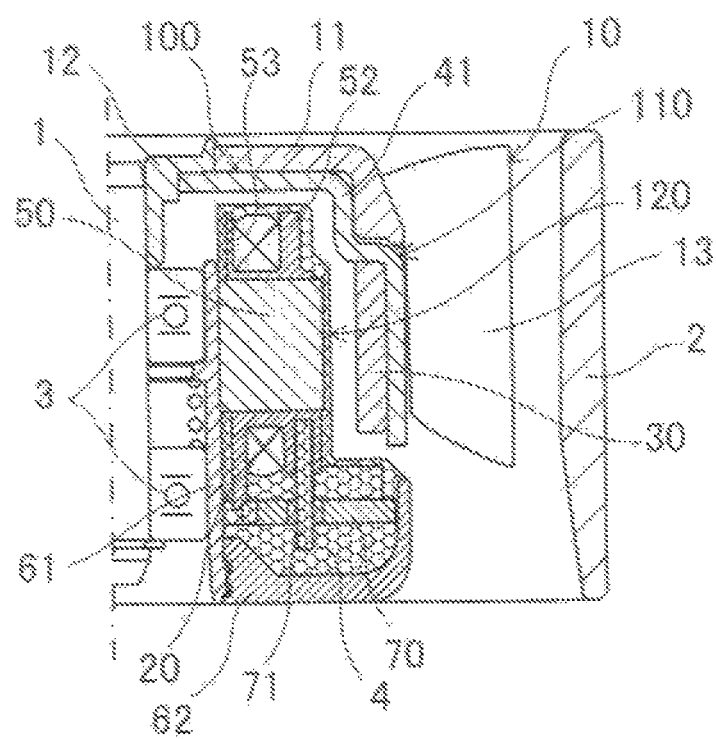
FIG. 1 is a cross-sectional view of a fan motor according to an embodiment of the present invention.
Figure 2:
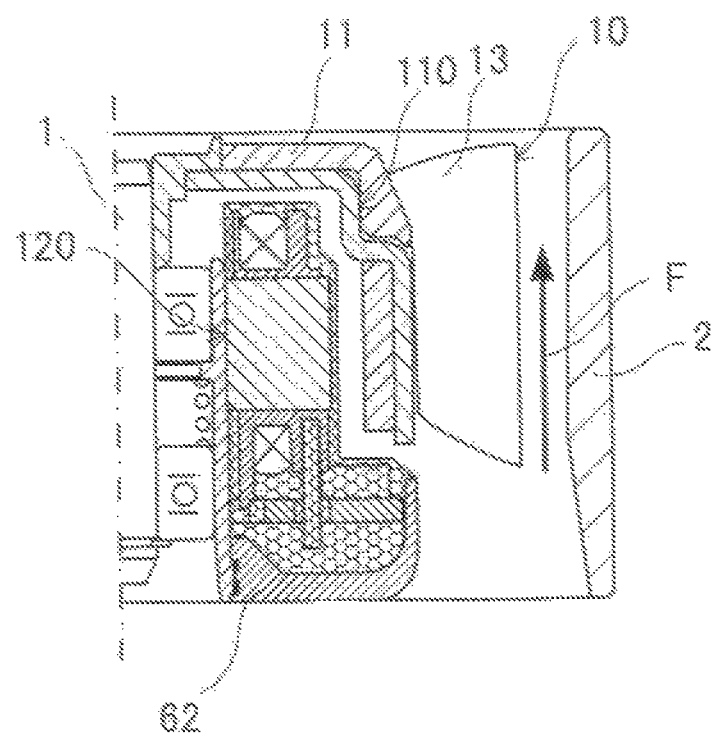
FIG. 2 is a cross-sectional view for explaining the airflow direction of the fan motor according to the embodiment.
Figure 3:
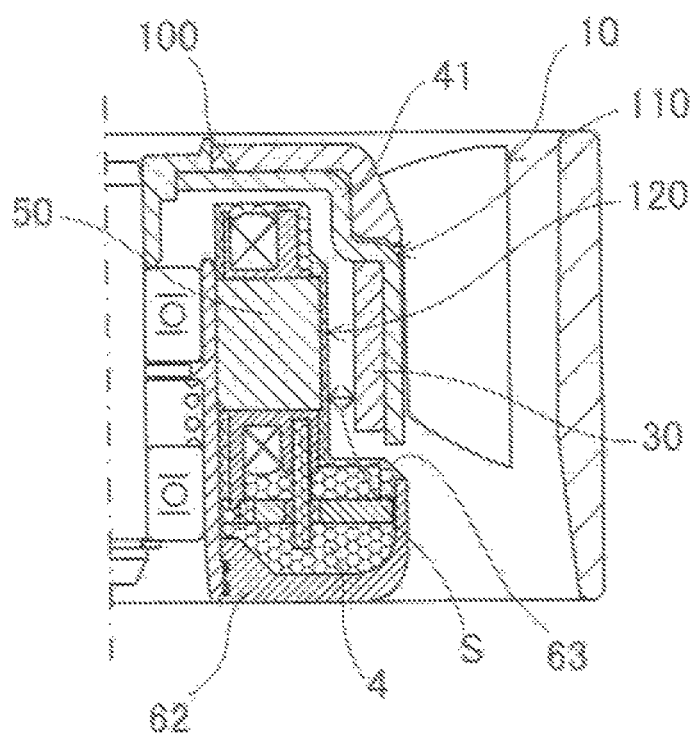
FIG. 3 is a cross-sectional view for explaining the oil-proof and dust-proof structure of the fan motor according to the embodiment.

Referring first to FIG. 1 to FIG. 3, the fan motor according to this embodiment will be described. FIG. 1 is a cross-sectional view of the fan motor according to this embodiment. FIG. 2 is a cross-sectional view for explaining the airflow direction of the fan motor according to this embodiment. FIG. 3 is a cross-sectional view for explaining the oil-proof and dust-proof structure of the fan motor according to this embodiment.

As shown in FIG. 1, the fan motor 200 includes a vane wheel 10 fixed to a rotary shaft 1, and a venturi casing (hereinafter, simply "casing") 2 surrounding the radially outer periphery of the vane wheel 10.

The vane wheel 10 includes a cup-shaped hub unit 11 located in a central portion thereof. A plurality of vanes 13 are provided along the outer periphery of the hub unit 11. The hub unit 11 is fixed to the rotary shaft 1 via a socket 12.

The hub unit 11 includes thereinside a motor 100 serving as the driving device of the vane wheel 10. The motor 100 according to this embodiment is, for example, an outer rotor type brushless motor . The motor 100 includes an armature having a winding 20 and serving as an inner stator 120, and an excitation unit having a permanent magnet 30 provided along the outer periphery of the stator 120, the excitation unit serving as an outer rotor 110.

The plurality of vanes 13 are radially attached to the periphery of the hub unit 11 of the vane wheel 10. The vanes 13 are each inclined with respect to the axial direction of the rotary shaft 1.

As shown in FIG. 2, the vane wheel 10 generates, upon rotating, an airflow F between the rotor 110 and the casing 2. The vanes 13 of the vane wheel 10 according to this embodiment are formed in a shape and structure that generates the airflow F from the side of a frame boss 62 toward the hub unit 11 of the vane wheel 10. The frame boss 62 has a generally cup-like shape, and serves as the base of the stator 120. The frame boss 62 and the hub unit 11 of the vane wheel 10 are located opposite to each other across the axial line of the rotary shaft 1.

Referring again to FIG. 1, the rotor 110 includes a generally cup-shaped rotor yoke (rotor cover) 41, the rotary shaft 1 press-inserted with the socket 12 in the central portion of the rotor yoke 41, and the permanent magnet 30. The stator 120 includes a stator stack 50 and the winding 20.

The rotor yoke 41 is fitted in the hub unit 11. The permanent magnet 30 is fixed to the inner circumferential surface of the rotor yoke 41 extending in the axial direction. The rotor yoke 41 serves to block the magnetic force from the excitation unit, to thereby maximizing the electromagnetic induction performance of the permanent magnet 30.

The leading end portion of the rotor yoke 41 sticks out further toward the frame boss 62 with respect to the leading end portion of the permanent magnet 30. The end portion of the rotor yoke 41 sticking out with respect to the end portion of the permanent magnet 30 contributes to preventing intrusion of oil into inside of the motor 100.

The rotor yoke 41 may be formed of, for example, an iron-based magnetic body such as an SC material, without limitation thereto.

The rotary shaft 1 is rotatably supported by a bearing 3. The bearing 3 is fixed to an inner face of a bearing supporter 61 of a cylindrical shape. The bearing supporter 61 is provided in the central portion of the frame boss 62.

The stator stack 50 is fixed to the outer face of the bearing supporter 61. The stator stack 50 is composed of a plurality of thin metal plates of a generally annular shape, stacked on each other in the plate-thickness direction. It is preferable to employ a silicon steel plate to form the metal plates for the stator stack 50, from the viewpoint of cost versus performance. Each of the metal plates of the stator stack 50 is covered with an electrical insulator such as varnish, before being stacked.

The stator stack 50 includes teeth 52 projecting therefrom. Slots 53 are defined between adjacent ones of the teeth 52. The slots 53 are aligned at regular intervals in the circumferential direction of the stator stack 50. The winding 20 provided around the stator stack 50 is accommodated inside the slot 53.

As shown in FIG. 3, the stator stack 50 and the permanent magnet 30 oppose each other across a gap S. The gap S is at least 0.8 mm in width, and set within the effective range of the electromagnetic induction between the winding 20 and the permanent magnet 30.

The gap S between the stator stack 50 and the permanent magnet 30 is set to 0.8 mm or wider in order to facilitate the oil that has intruded into inside of the motor 100 to be discharged, by increasing the width of the gap S compared with the conventional structure. In contrast, the gap S between the stator stack 50 and the permanent magnet 30 is set to fall within the effective range of the electromagnetic induction between the winding 20 and the permanent magnet 30, in order to assure the performance as a brushless motor. Here, the effective range of the electromagnetic induction is determined according to the number of turns of the winding 20 and the magnetic force of the permanent magnet 30.

Back again to FIG. 1, the frame boss 62 and the casing 2 are connected to each other via a non-illustrated frame. A circuit board 70 is placed on the frame boss 62. A wiring pattern for controlling the fan motor 200 is provided on the circuit board 70.

The winding 20 wound around the stator stack 50 and the circuit board 70 are connected via a joint terminal 71. The joint terminal 71 aggregates the jumper wires of the windings 20 together for connection to the circuit board 70.

The live parts such as the stator stack 50, the windings 20, the circuit board 70, and the joint terminal 71 are covered with an electrical insulator 4. The electrical insulator 4 may be formed of, for example, a molded resin, without limitation thereto.

Referring again to FIG. 3, a sloped surface 63 is formed along the outer periphery of the frame boss 62, on the side of the opening thereof. The sloped surface 63 is inclined so as to gradually increase the gap between the opening edge of the frame boss 62 and the opening edge of the rotor yoke 41 in a radially outward direction, the sloped surface beginning at the interface between rotor yoke and the permanent magnet 30. Although the electrical insulator 4 constitutes the sloped surface 63 in this embodiment, alternatively the opening edge of the frame boss 62 may be formed in a tapered shape.

[Advantageous Effects of Fan Motor]

Referring now to FIG. 1 to FIG. 4, the advantageous effects of the fan motor 200 according to this embodiment will be described.

The fan motor 200 according to this embodiment may be attached to a casing of an electronic apparatus or an opening of an inner wall of a plant building. The fan motor 200 according to this embodiment is configured on assumption that the fan motor 200 is installed in an environment where cutting oil and dust are floating in the air, such as a machinery plant.

In the case of operating the fan motor 200 in an environment where cutting oil and dust are floating in the air, the oil is less likely to stick to the fan motor 200 during the operation, because centrifugal force is applied while the fan motor 200 is rotating.

However, when the fan motor 200 is stopped for a long period of time in the environment where oil is floating in the air, the floating coil sticks to the fan motor 200.

As shown in FIG. 2, in the fan motor 200 according to this embodiment the vanes 13 of the vane wheel 10 are formed so as to generate the airflow F from the side of the frame boss 62 toward the hub unit 11 of the vane wheel 10.

Accordingly, the side of the frame boss 62 is on the windward side of the airflow F in the fan motor 200 according to this embodiment, which is opposite to the airflow direction in a conventional fan motor 300 (see FIG. 2 and FIG. 4). Such direction of the airflow F in the fan motor 200 according to this embodiment prevents oil from sticking to the hub unit 11 of the vane wheel 10.

For the purpose of comparison, FIG. 4 illustrates the fan motor 300 having the conventional structure.

As shown in FIG. 4, the conventional fan motor 300 is configured so as to generate an airflow f from the side of a hub unit 311 of a vane wheel 310 toward the side of a frame boss 362, between a rotor 410 and a casing 302.

In other words, the side of the hub unit 311 of the vane wheel 310 is on the windward side of the airflow f in the conventional fan motor 300, and therefore oil is prone to stick to the hub unit 311. The oil deposited on the hub unit 311 drips down along vanes 313 and the sidewall of the hub unit 311, and then intrudes into inside of the fan motor 300 thus to firmly reside therein. As a result, the fan motor 300 is suppressed from smoothly rotating, or even inhibited from rotating when the fan motor 300 is activated again.

Further, the fan motor 200 according to this embodiment is built with an oil-proof and dust-proof structure as described hereunder. As shown in FIG. 1, the live parts such as the stator stack 50, the windings 20, the circuit board 70, and the joint terminal 71 are covered with the electrical insulator 4. Since the live parts where an electric current runs are thus protected by the electrical insulator 4 from moisture, oil, and dust, electrical malfunctions such as insufficient conduction and short-circuit can be prevented.

The leading end portion of the rotor yoke 41 sticks out further toward the frame boss 62 with respect to the leading end portion of the permanent magnet 30. The end portion of the rotor yoke 41 sticking out with respect to the end portion of the permanent magnet 30 contributes to preventing intrusion of oil into inside of the motor 100.

In contrast, in the conventional fan motor 300 the end portion of the rotor yoke 341 and the end portion of the permanent magnet 330 are flush with each other, and hence oil is prone to intrude into inside of the motor 300.

Further, as shown in FIG. 3, the gap S between the stator stack 50 and the permanent magnet 30 is at least 0.8 mm, and set within the effective range of the electromagnetic induction between the winding 20 and the permanent magnet 30. The gap S between the stator stack 50 and the permanent magnet 30 is wider than a gap D between a stator stack 350 and a permanent magnet 330 of the conventional fan motor 300 (see FIG. 4). Such a configuration prevents deposition of oil that has intruded into inside of the motor 100, and facilitates such oil to be efficiently discharged.

Further, the sloped surface 63 is formed along the outer periphery of the frame boss 62, on the side of the opening thereof. The sloped surface 63 prevents oil from intruding into inside of the motor 100, and facilitates oil to be efficiently discharged.

In the conventional fan motor 300, in contrast, the sloped surface is not provided along the outer periphery of the frame boss 362 on the side of the opening thereof, and therefore oil is prone to intrude into inside of the motor 300 and to be deposited therein.

Thus, the fan motor 200 according to this embodiment prevents the intrusion of oil into inside of the motor 100, thereby preventing the rotor 110 from being restrained in an environment where oil and dust are floating in the air.

Although a preferred embodiment of the present invention has been described as above, it is to be understood that the foregoing embodiment is merely exemplary and in no way intended to limit the scope of the present invention. The configuration according to the foregoing embodiment may be modified in various manners without departing from the scope and spirit of the present invention.

What is claimed is:

1. A fan motor comprising:
    a stator including an armature having a winding thereon;
    a rotor including a permanent magnet and a rotor yoke;
    a vane wheel fixed to the rotor and including a plurality of vanes;
    a frame boss being a base of the stator;
    the frame boss and a hub unit of the vane wheel being located opposite each other across an axial line of a rotary shaft of the fan motor;
    the vanes or the vane wheel being formed to generate an airflow between the rotor and a casing when the rotor is rotated, the airflow being generated in a direction from a side of the frame boss toward a side of the hub unit of the vane wheel with the frame boss located on an intake side of the fan motor and the hub unit located on an output side of the fan motor;
    a planar sloped surface being formed in an outer periphery of the frame boss, the planar sloped surface extending from a portion of the outer periphery of the frame boss facing the hub unit to a portion of the outer periphery of the frame boss facing the casing; and
    an innermost end of the planar sloped surface being formed parallel to and offset from an axis of rotation so that it is displaced from an inner diameter of an edge of the rotor yoke;
    and wherein the sloped surface is inclined so as to gradually increase a gap between an opening edge of the frame boss and the edge of the rotor yoke in a radially outward direction.

2. The fan motor according to claim 1, wherein a live part of the stator is covered with an electrical insulator.

3. The fan motor according to claim 1, wherein a clearance between the stator and the permanent magnet is at least 0.8 mm.

4. The fan motor according to claim 1, wherein a leading end portion of the rotor yoke sticks out further with respect to a leading end portion of the permanent magnet.

5. The fan motor according to claim 1, further comprising the fan motor having an intake side and an output side, the vanes have a leading and trailing edge relative to the direction of the airflow, and the leading edge is interior to the fan motor and the trailing edge is adjacent to the output side.

6. The fan motor according to claim 1, wherein a distance between the planar sloped surface and the rotor gradually increases as the sloped surface extends radially outward.

7. The fan motor according to claim 1, wherein the frame boss includes a horizontal surface extending directly from the innermost end of the sloped surface beneath a magnet of the rotor.

* * * * *